C. ENACHE.
MANUALLY PROPELLED VEHICLE.
APPLICATION FILED JUNE 25, 1921.

1,410,245.

Patented Mar. 21, 1922.
2 SHEETS—SHEET 1.

Inventor
C. Enache,
By Jack A. Ashley
Attorney

C. ENACHE.
MANUALLY PROPELLED VEHICLE.
APPLICATION FILED JUNE 25, 1921.

1,410,245.

Patented Mar. 21, 1922.
2 SHEETS—SHEET 2.

Inventor
C. Enache
By Jack A. Athey
Attorney

UNITED STATES PATENT OFFICE.

COCIU ENACHE, OF DALLAS, TEXAS.

MANUALLY-PROPELLED VEHICLE.

1,410,245.   Specification of Letters Patent.   Patented Mar. 21, 1922.

Application filed June 25, 1921. Serial No. 480,277.

*To all whom it may concern:*

Be it known that I, COCIU ENACHE, a citizen of Turkey, residing at Dallas, in the county of Dallas and State of Texas, have invented certain new and useful Improvements in Manually-Propelled Vehicles, of which the following is a specification.

This invention relates to new and useful improvements in manually propelled vehicles.

The object of the invention is to provide a vehicle simulating a small automobile of the roadster type and to provide said vehicle with a steering gear and a foot operated driving gearing whereby the vehicle is propelled.

A further object of the invention is to provide a vehicle which will be attractive in appearance and which may be propelled at a comparatively high rate of speed with a minimum expenditure of energy, and which will be simple and superior in construction.

A construction designed to carry out the invention will be hereinafter described together with other features of the invention.

Figure 1:
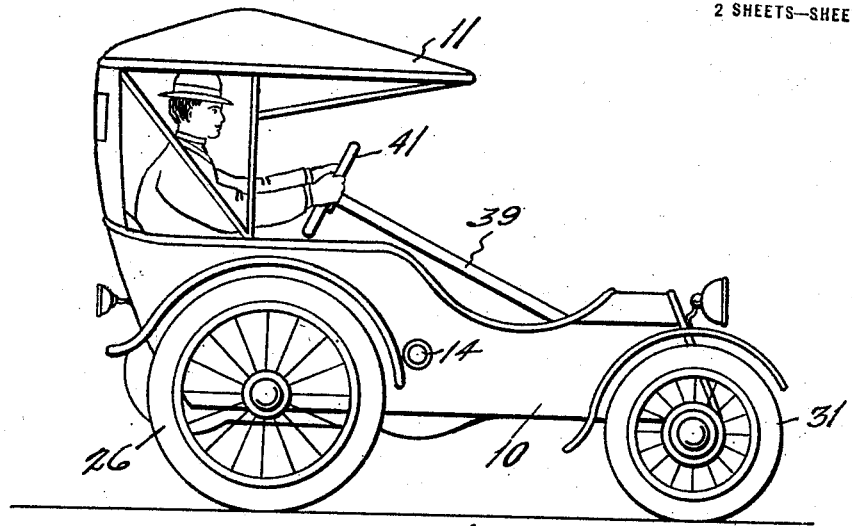
Figure 2:
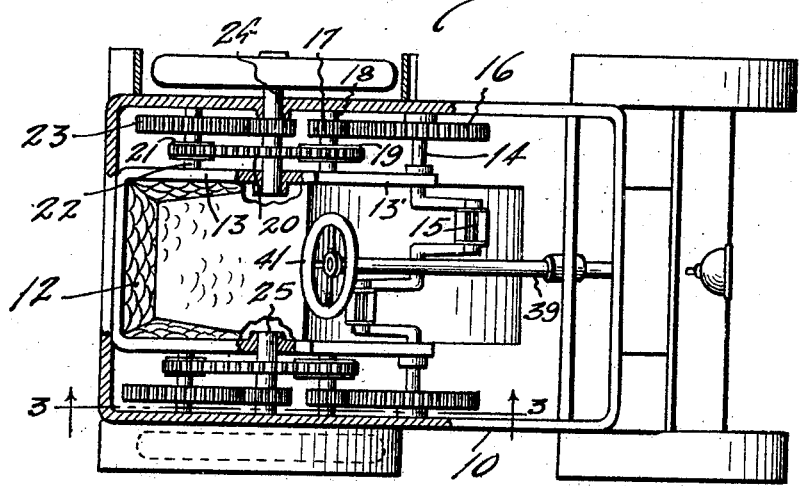
Figure 7:
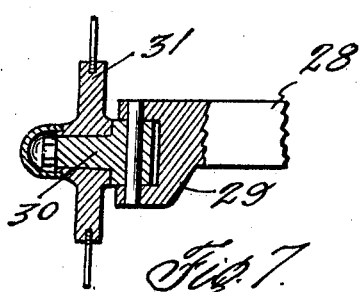
Figure 3:
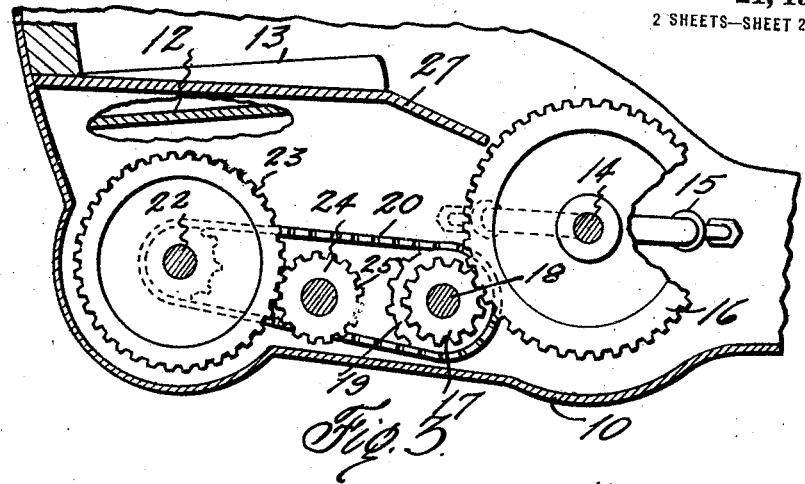
Figure 4:
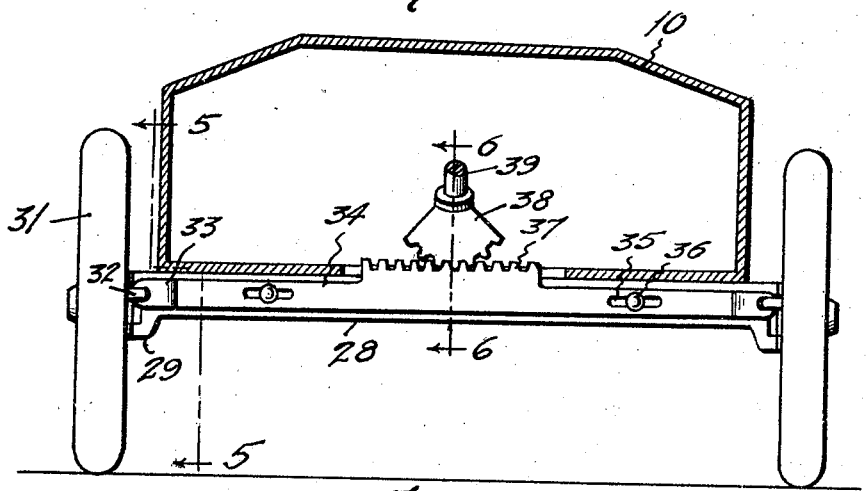
Figure 5:
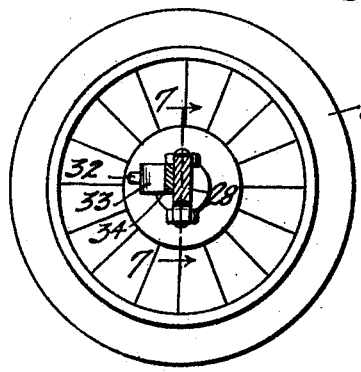
Figure 6:
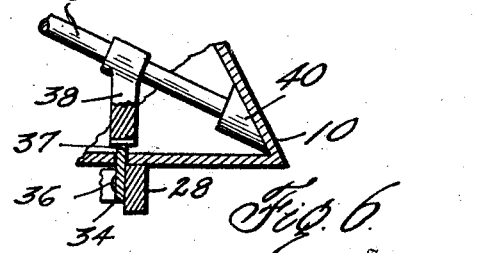

The invention will be more readily understood from a reading of the following specification and by reference to the accompanying drawings, in which an example of the invention is shown and wherein:

Fig. 1 is a side elevation of a vehicle constructed in accordance with my invention, Fig. 2 is a horizontal cross sectional view, Fig. 3 is an enlarged vertical sectional view taken on the line 3—3 of Fig. 2, Fig. 4 is an enlarged cross sectional view of the front end of the vehicle, Fig. 5 is a sectional detail on the line 5—5 of Fig. 4, Fig. 6 is a sectional detail on the line 6—6 of Fig. 4, and Fig. 7 is a sectional detail on the line 7—7 of Fig. 5.

In the drawings the numeral 10 designates a motor vehicle body which may be of any suitable shape and construction. I prefer to mount a top 11 on the body and provide a seat 12 in the rear portion thereof. On each side of the seat is an upright partition member 13, which has forwardly extending brackets 13′ in which is mounted a crank shaft 14 having its end supported in suitable bearings in the sides of the body. The crank shaft has pedals 15 adapted to be engaged by the feet of the driver occupying the seat 12.

Near each end the crank shaft has fastened thereon a driving gear 16, each of which meshes with a pinion 17 mounted on a counter shaft 18 supported between one of the partitions 13 and the side of the body. On each shaft 18 is mounted a sprocket wheel 19 which supports the end of and drives a rearwardly extending sprocket chain 20. The rear end of the chain engages around and drives a sprocket wheel 21 of smaller diameter than the wheel 19.

The wheels 21 are each supported on a second counter shaft 22 supported like the shaft 18. On each shaft 22 is fastened a gear 23 which meshes with a pinion 24 mounted on a stub axle 25, penetrating the side of the body. On each rear axle 25 is mounted a wheel 26 of the automobile type. It will be seen that the train of gears and driving means is confined in the spaces on each side of the seat and may have covers 27.

The front end of the body is supported by a front axle 28 having yokes 29 at its end as is best shown in Fig. 7. Wheel spindles 30 are pivoted in the yokes and are mounted in front wheels 31 similar to the rear wheels. Each spindle has an eye 32 directed rearwardly from its hub, which is engaged by an offset ear 33 on the end of a transverse steering bar 34. The bar has slots 35 receiving headed studs 36, whereby it is slidably mounted on the axle.

At its central portion the bar has an upstanding gear rack 37 which is engaged by a gear sector 38 depending from a steering post 39. The post 39 is mounted in a bearing box 40 (Fig. 6) in the front of the body and is inclined upwardly toward the seat 12. A steering wheel 41 is mounted on the upper end of the post. By turning the wheel 41 the sector 38 is swung, whereby the bar 34 is slid and the front wheels swung to turn the vehicle. This makes a simple and efficient steering gear.

The driver occupies the seat 12 and engages his feet with the pedals 15 thus revolving the crank shaft 14. The revolving crank shaft transmits motion through the agency of the gears 16, pinions 17, sprocket wheels 19, chains 20, sprocket wheels 21, gears 23 and pinions 24, to the rear axles 25. It will be seen that the gearing is such as to develop considerable power and cause the rear axle and rear wheels to revolve at a comparatively high rate of speed. A vehicle of this character may be operated cheaply and is easily controlled. As a child's vehicle it is highly successful.

Various changes in the size and construction as well as modifications, may be made without departing from the spirit of the invention.

What I claim, is:

1. In a manually propelled vehicle, a body, a seat mounted in the body, rear axles mounted in rear wheels, a crank shaft mounted in the body and having pedals, a gear mounted on the crank shaft at each end, counter shafts in the body, pinions mounted on the counter shaft and driven by the gears, a second counter shaft in each side of the body, a chain and sprocket driving connection between the first and second counter shafts on each side of the body, gears mounted on the second counter shafts, and pinions on the rear axles engaged by the last named gears.

2. In a manually propelled vehicle, a body, a seat mounted in the body, rear axles mounted in rear wheels, a crank shaft mounted in the body and having pedals, a gear mounted on the crank shaft at each end, counter shafts in the body, pinions mounted on the counter shaft and driven by the gears, a second counter shaft in each side of the body, a chain and sprocket driving connection between the first and second counter shafts on each side of the body, gears mounted on the second counter shafts, pinions on the rear axles engaged by the last named gears, covers for the gearing, a seat in the rear of the body, and a steering gear for the front wheels.

3. In a manually propelled vehicle, the combination of a body, a seat mounted at the central rear portion of the body, rear axles mounted in the body on each side of the seat, rear wheels mounted on the axles, a transverse crank shaft mounted in the body in front of the seat and having pedals, front wheels supporting the front end of the body, enclosed gear compartments in the body on each side of the seat, and means disposed in the gear compartments for transmitting motion from the crank shaft to the rear axles.

In testimony whereof I affix my signature.

COCIU ENACHE.